(12) United States Patent
Feng

(10) Patent No.: US 11,470,530 B2
(45) Date of Patent: *Oct. 11, 2022

(54) CARRIER SWITCHING METHOD, TERMINAL AND BASE STATION

(71) Applicant: GUANGDONG OPPO MOBILE TELECOMMUNICATIONS CORP., LTD., Guangdong (CN)

(72) Inventor: Bin Feng, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 174 days.

This patent is subject to a terminal disclaimer.

(21) Appl. No.: 16/926,927

(22) Filed: Jul. 13, 2020

(65) Prior Publication Data

US 2020/0344659 A1 Oct. 29, 2020

Related U.S. Application Data

(63) Continuation of application No. 15/740,272, filed as application No. PCT/CN2015/097443 on Dec. 15, 2015, now Pat. No. 10,849,039.

(51) Int. Cl.
*H04W 36/24* (2009.01)
*H04W 36/00* (2009.01)
*H04W 72/04* (2009.01)

(52) U.S. Cl.
CPC ....... *H04W 36/24* (2013.01); *H04W 36/0055* (2013.01); *H04W 72/042* (2013.01); *H04W 72/0453* (2013.01)

(58) Field of Classification Search
CPC ............... H04W 36/24; H04W 72/042; H04W 72/0453; H04W 72/0446; H04W 56/001; H04L 5/0012
See application file for complete search history.

(56) References Cited

U.S. PATENT DOCUMENTS

| 2011/0064042 A1* | 3/2011 | Kim ............... H04L 5/0094 370/329 |
| 2011/0199951 A1 | 8/2011 | Kwon |
| 2012/0099537 A1 | 4/2012 | Leelahakriengkrai |
| 2012/0142361 A1 | 6/2012 | Zhao |

(Continued)

FOREIGN PATENT DOCUMENTS

| CN | 101667960 A | 3/2010 |
| CN | 101668319 A | 3/2010 |

(Continued)

OTHER PUBLICATIONS

Reconsideration Report of the Japanese application No. 2020-005100, dated Oct. 15, 2021.

(Continued)

*Primary Examiner* — Ricardo H Castaneyra

(57) ABSTRACT

A carrier switching method, a terminal and a base station are provided. According to the method, a carrier set sharing the same set of system information is set, and the base station switches to a new carrier belonging to the same carrier set with an old carrier, and indicates, through signaling, the terminal to perform carrier switching and perform necessary frequency and bandwidth adjustment in case of interference to an operating frequency.

16 Claims, 14 Drawing Sheets

(56) References Cited

U.S. PATENT DOCUMENTS

| | | | |
|---|---|---|---|
| 2012/0327797 | A1 | 12/2012 | Siomina |
| 2013/0010709 | A1 | 1/2013 | Earnshaw |
| 2013/0258875 | A1 | 10/2013 | Siomina |
| 2014/0003390 | A1 | 1/2014 | Gholmieh et al. |
| 2014/0269585 | A1 | 9/2014 | Earnshaw et al. |
| 2015/0092674 | A1 | 4/2015 | Das et al. |
| 2015/0208411 | A1 | 7/2015 | Mochizuki et al. |
| 2015/0245219 | A1 | 8/2015 | Wei |
| 2015/0333889 | A1 | 11/2015 | Earnshaw et al. |
| 2015/0334770 | A1 | 11/2015 | Kwon et al. |
| 2015/0382271 | A1 | 12/2015 | Siomina et al. |
| 2016/0143035 | A1 | 5/2016 | Xue et al. |
| 2016/0366000 | A1 | 12/2016 | Pelletier et al. |
| 2017/0290039 | A1 | 10/2017 | Mochizuki et al. |

FOREIGN PATENT DOCUMENTS

| | | |
|---|---|---|
| CN | 102065496 A | 5/2011 |
| CN | 102204144 A | 9/2011 |
| CN | 102215538 A | 10/2011 |
| CN | 102271407 A | 12/2011 |
| CN | 102281639 A | 12/2011 |
| CN | 102714586 A | 10/2012 |
| CN | 102823150 A | 12/2012 |
| CN | 103702379 A | 4/2014 |
| CN | 104412653 A | 3/2015 |
| EP | 2882245 A1 | 6/2015 |
| JP | 2017511987 A | 4/2017 |
| WO | 2010105254 A2 | 9/2010 |
| WO | 2011121775 A1 | 10/2011 |
| WO | 2013107379 A1 | 7/2013 |
| WO | 2014205742 A1 | 12/2014 |
| WO | 2015126028 A1 | 8/2015 |
| WO | 2015184583 A1 | 12/2015 |

OTHER PUBLICATIONS

"3rd Generation Partnership Project; Technical Specification Group Radio Access Network; Evolved Universal Terrestrial Radio Access (E-UTRA);Radio Resource Control (RRC); Protocol specification (Release 12)",3GPP Standard; 3GPP TS 36.331, 3rd Generation Partnership Project (3GPP), Mobile Competence Centre ; 650, Route Des Lucioles ; F-06921 Sophia-Antipolis Cedex ; France,vol. RAN WG2, No. V12.6.0, Jun. 30, 2015 (Jun. 30, 2015), pp. 1-449,XP050965796[retrieved on Jun. 30, 2015].

Second Office Action of the European application No. 15910491.8, dated Dec. 17, 2021.

Notice of Rejection Decision of the Japanese application No. 2020-005100, dated Mar. 26, 2021.

Notice of Rejection Decision of the Chinese application No. 201580081080.0, dated Jun. 2, 2021.

First Office Action of the Japanese application No. 2020-005100, dated Nov. 27, 2020.

Second Office Action of the Chinese application No. 201580081080.0, dated Feb. 22, 2021.

International Search Report in the international application No. PCT/CN2015/097443, dated Aug. 24, 2016.

English translation of the Written Opinion of the International Search Authority in the international application No. PCT/CN2015/097443, dated Aug. 24, 2016.

Supplementary European Search Report in the European application No. 15910491.8, dated Jan. 18, 2019.

Huawei, HiSilicon, UE support of carrier selection for LAA (online), 3GPP TSG RAN WG1#82bis, 3GPP, Oct. 9, 2015, R1-155068, search date (May 24, 2019), Internet <URL: http: //www.3gpp.org/ftp/tsg_ran/WG1__RL1/TSGRI__82b/Docs/R1-155068.zip>.

Etri, Discussion on Carrier Selection in LAA(online), 3GPP TSG RAN WG2#89bis, 3GPP, Apr. 24, 2015, R2-151292, search date (May 24, 2019), Internet <URL: http://www.3gpp.org/ftp/tsg_ran/WG2_RL2/TSGR2_89bis/Docs/R2-151292.zip>.

InterDigital, RAN2 Impacts for Supporting License Assisted Access using LTE(online), 3GPP TSG RAN WG2#89, 3GPP, Feb. 13, 2015, R2-150533, search date (May 24, 2019), Internet <URL: http:// www.3gpp.org/ftp/tsg__ran/WG2_RL2/TSGR_89/Docs/R2-150533.zip>.

First Office Action of the Japanese application No. 2017-568107, dated May 31, 2019.

First Office Action of the Indian application No. 201817005466, dated Mar. 13, 2020.

Notice of Allowance of the Japanese application No. 2017-568107, dated Mar. 6, 2020.

Decision of Refusal of the Japanese application No. 2017-568107, dated Sep. 20, 2019.

First Office Action of U.S. Appl. No. 15/740,272, dated Aug. 5, 2019.

Final Office Action of U.S. Appl. No. 15/740,272, dated Jan. 30, 2020

Notice of Allowance of U.S. Appl. No. 15/740,272, dated Apr. 6, 2020.

Lenovo, "DL scheduling for LAA SCells", 3GPP TSG RAN WG1 Meeting #83 R1-156734, Anaheim, USA, published on Nov. 6, 2015.

Panasonic, "Self-scheduling and cross-scheduling options for unlicensed carrier access", 3GPP TSG-RAN WG1 Meeting 83 R1-156962, Anaheim, USA, published on Nov. 7, 2015.

LG Electronics et al, "WF on scheduling in LAA", 3GPP TSG RAN WG1 #83 R1-157578, Anaheim, USA, published on Nov. 24, 2015.

First Office Action of the Chinese application No. 201580081080.0, dated Aug. 31, 2020.

First Office Action of the European application No. 15910491.8, dated Jul. 9, 2020.

Notice of Allowance of the U.S. Appl. No. 15/740,272, dated Jul. 24, 2020.

* cited by examiner

200

A terminal receives signaling sent by a base station on a carrier(s) of a first carrier subset, wherein the terminal currently keeps a connection on the carrier(s) of the first carrier subset, the signaling is configured to indicate the terminal to switch from the carrier(s) of the first carrier subset to a carrier(s) of a second carrier subset to keep the connection, both the first carrier subset and the second carrier subset belong to a preset carrier set, center frequencies and/or bandwidths of any two carriers in the preset carrier set are different from each other, all carriers of the preset carrier set share the same set of system information, each of the first carrier subset and the second carrier subset includes at least one carrier, and the carrier(s) of the first carrier subset and the carrier(s) of the second carrier subset are not completely the same ~S210

The terminal starts keeping the connection on the carrier(s) of the second carrier subset from a first instant according to the signaling ~S220

```
A terminal receives signaling sent by a base station at a
second instant on a carrier(s) of a first carrier subset,
wherein the terminal currently camps on the carrier(s) of the
first carrier subset, the signaling is configured to indicate the
terminal to switch from the carrier(s) of the first carrier
subset to a carrier(s) of a second carrier subset for camping,
the first carrier subset and the second carrier subset both
belong to a preset carrier set, center frequencies and/or
bandwidths of any two carriers in the preset carrier set are
different from each other, all carriers of the preset carrier set
share the same set of system information, each of the first
carrier subset and the second carrier subset includes at least
one carrier, and the carrier(s) of the first carrier subset and
the carrier(s) of the second carrier subset are not completely
the same
```
~ S510

The terminal starts camping on the carrier(s) of the second carrier subset from a first instant according to the signaling ~ S520

| A base STation sends signaling to a terminal, the signaling being configured to indicate that the base station switches from a carrier(s) of a first carrier subset to a carrier(s) of a second carrier subset for operation, the first carrier subset and the second carrier subset both belonging to a preset carrier set, center frequencies and/or bandwidths of any two carriers in the preset carrier set being different from each other, all carriers of the preset carrier set sharing the same set of system information, each of the first carrier subset and the second carrier subset including at least one carrier and the carrier(s) of the first carrier subset and the carrier(s) of the second carrier subset being not completely the same | S610 |

| The base station starts operation on the carrier(s) of the second carrier subset from a first instant | S620 |

FIG. 6

CARRIER SWITCHING METHOD, TERMINAL AND BASE STATION

CROSS-REFERENCE TO RELATED APPLICATIONS

This is a continuation application of U.S. application Ser. No. 15/740,272 filed on Dec. 27, 2017, which is a national phase application of PCT Application No. PCT/CN2015/097443 filed on Dec. 15, 2015, the entire contents of which are incorporated herein by reference in their entireties.

TECHNICAL FIELD

Embodiments of the disclosure relate to the field of communications, and more particularly to a carrier switching method, a terminal and a base station.

BACKGROUND

At present, using an unlicensed frequency band, for example, a 2.4 GHz frequency band and a 5.8 GHz frequency band, to extend a using frequency is gradually started to be considered in a wireless cellular system, and two methods are mainly adopted, i.e. a License Assisted Access (LAA) technology and a Long Term Evolution (LTE)/Wireless-Fidelity (Wi-Fi) aggregation technology. The two aggregation technologies mainly have the following characteristics: (1) an aggregated resource includes an unlicensed frequency band, and the unlicensed frequency band is merely used as an auxiliary frequency band of a licensed frequency band; and (2) use of the unlicensed frequency band is limited to both scheduling of a base station and the load of the frequency band, and namely, may be used only through a competition mechanism.

At the present stage, an unlicensed frequency band is merely used as a supplementary of a licensed frequency band. For example, in the LAA technology, an unlicensed frequency band may adopt an operating mode of LTE, but may merely be used as a Secondary Cell (SCell) of the licensed frequency band. In the future, use of an unlicensed frequency band may support an independent operating mode on the basis of an existing Carrier Aggregation (CA)-based LAA technology, that is, a terminal may independently camp in and access a carrier of an unlicensed frequency band and send/receive data through the carrier. In order to enable an independent operating function of a carrier of an unlicensed frequency band, the simplest method is to introduce all of the broadcast mechanism, paging mechanism and uplink and downlink access and transmission mechanism applied to a licensed frequency band in an existing LTE system into the unlicensed frequency band. However, the unlicensed frequency band is a common frequency band, so that not only may the LTE system operate thereon, but also another system, for example, Wi-Fi, may operate thereon.

Therefore, for meeting a control requirement of frequency resource sharing of multiple systems, a Listen Before Talk (LBT) mechanism is introduced into an existing LAA system using an unlicensed frequency band, that is, before using the unlicensed frequency band, a terminal has to measure quality of a channel and an interference condition and monitor the channel to check if it is occupied by others before use.

Except introduction of the LBT mechanism, the existing LAA system substantially follows the existing mechanism and flow of LTE, that is, a fixed carrier and fixed bandwidth of an unlicensed frequency band are determined as an operating frequency and bandwidth of the system. A terminal uses a licensed frequency band as a sending and receiving carrier of a Primary Cell (PCell) for system information and Radio Resource Control (RRC) information, and performs data transmission. The system configures an LAA carrier to the terminal as an SCell through RRC signaling born by the PCell. In the whole process, the system bandwidth and the operating center frequency of the system are kept unchanged.

In a system independently operating on an unlicensed frequency band, if an existing manner of a fixed system bandwidth and center frequency is still adopted, although an independent operating mode may be supported, it is impossible to perform necessary frequency and bandwidth adjustment in case of interference to an operating frequency, thereby affecting user experiences.

SUMMARY

The embodiments of the disclosure provide a carrier switching method, a terminal and a base station, which may implement carrier switching and improve a user experience.

A first aspect provides a carrier switching method, which may include that: a terminal receives signaling sent by a base station on a carrier of a first carrier subset, wherein the terminal may currently keep a connection on the carrier of the first carrier subset, the signaling may indicate the terminal to switch from the carrier of the first carrier subset to a carrier of a second carrier subset to keep the connection, the first carrier subset and the second carrier subset may both belong to a preset carrier set, center frequencies and/or bandwidths of any two carriers in the preset carrier set may be different, all carriers of the preset carrier set may share the same set of system information, each of the first carrier subset and the second carrier subset may include at least one carrier, and the carrier of the first carrier subset and the carrier of the second carrier subset may not be completely the same; and the terminal starts keeping the connection on the carrier of the second carrier subset from a first instant according to the signaling.

In a possible implementation mode of the first aspect, the method may further include that: the terminal acquires the system information through the carrier of the second carrier subset after the first instant.

The signaling of the disclosure may include first configuration information indicating the carrier of the second carrier subset.

Preferably, the first configuration information may include a carrier index, center frequency index or bitmap indicating the carrier of the second carrier subset.

In a possible implementation mode of the first aspect, the operation that the terminal receives the signaling sent by the base station on the carrier of the first carrier subset may include that: the terminal receives the signaling sent by the base station in a subframe n on the carrier of the first carrier subset, wherein n may be a subframe index number; and the operation that the terminal starts keeping the connection on the carrier of the second carrier subset from the first instant according to the signaling may include that: the terminal starts keeping the connection on the carrier of the second carrier subset from a subframe n+N according to the signaling, wherein N may be a positive integer.

N may be a constant; or N may be determined according to a predetermined rule; or N may be configured by the base station.

In the disclosure, the signaling may be carried by at least one of a broadcast channel, Downlink Control Information (DCI) in a Common Search Space (CSS) of a Physical Downlink Control Channel (PDCCH), DCI in a CSS of an Enhanced PDCCH (EPDCCH), DCI in a User Equipment (UE)-specific Search Space (USS) of the PDCCH, DCI in a USS of the EPDCCH, a dedicated physical channel, a Media Access Control (MAC)header, a MAC Control Element (CE), system information of an RRC layer and dedicated signaling of the RRC layer.

In a possible implementation mode of the first aspect, N may be determined according to the predetermined rule, and the method may further include that: the terminal determines that the base station transmits data in P continuous subframe(s), wherein P may be a positive integer; the operation that the terminal receives the signaling sent by the base station on the carrier of the first carrier subset may include that: the terminal receives the signaling sent by the base station in the subframe n on the carrier of the first carrier subset, wherein the subframe n may be a subframe in the P continuous subframe(s); the operation that the terminal starts keeping the connection on the carrier of the second carrier subset from the first instant according to the signaling may include that: the terminal judges whether a subframe n+Q is a subframe in the P continuous subframe(s) or not, wherein Q may be a positive integer and Q may be a constant; when the subframe n+Q is not a subframe in the P continuous subframe(s), it is determined that the subframe n+N is the subframe n+Q; when the subframe n+Q is a subframe in the P continuous subframe(s), it is determined that the subframe n+N is a Cth subframe after the P continuous subframe(s), wherein C may be a positive integer and C may be a constant; and the terminal starts keeping the connection on the carrier of the second carrier subset from the subframe n+N.

A physical meaning of Q is a system processing delay, that is, Q is related to the system processing delay; and a physical meaning of C is a frequency switching processing delay, that is, C is related to the frequency switching processing delay. In a possible implementation mode of the first aspect, the method may further include that: the terminal determines that the base station transmits data in P continuous subframe(s), wherein P may be a positive integer, and the subframe n and the subframe n+N may be subframes in the P continuous subframe(s); the operation that the terminal starts keeping the connection on the carrier of the second carrier subset from the subframe n+N according to the signaling may include that: the terminal starts detecting a signal or physical channel sent by the base station on the carrier of the second carrier subset from the subframe n+N, and determines whether the base station occupies the carrier of the second carrier subset for data transmission or not; or the terminal starts detecting DCI and/or transmitted data on the carrier of the second carrier subset from the subframe n+N until an end of the P subframe(s); or the terminal starts detecting DCI and/or transmitted data on the carrier of the second carrier subset from the subframe n+N until an end of P+E subframe(s), wherein E may be a non-negative integer, and a value of E may be related to a length of an idle time-domain resource required by frequency switching; or the terminal receives second configuration information sent by the base station on the carrier of the second carrier subset in the subframe n+N, the second configuration information indicating a number T of subframe(s) for continuous transmission, started from the subframe n+N, of the base station, wherein T may be a positive integer, and the terminal starts detecting DCI and/or transmitted data on the carrier of the second carrier subset from the subframe n+N until an end of the T subframe(s).

The carrier switching method of the first aspect is applied to a terminal in a connected state, the carrier set sharing the same set of system information is set, and when receiving an instruction indicating carrier switching from the base station, the terminal in the connected state keeps the connection on a new carrier belonging to the same carrier set with an old carrier, and performs necessary frequency and bandwidth adjustment in case of interference to an operating frequency, so that carrier switching may be implemented, and a user experience is improved.

A second aspect provides a carrier switching method, which may include that: a terminal receives signaling sent by a base station at a second instant on a carrier of a first carrier subset, wherein the terminal may currently camp on the carrier of the first carrier subset, the signaling may indicate the terminal to switch from the carrier of the first carrier subset to a carrier of a second carrier subset for camping, the first carrier subset and the second carrier subset may both belong to a preset carrier set, center frequencies and/or bandwidths of any two carriers in the preset carrier set may be different, all carriers of the preset carrier set may share the same set of system information, each of the first carrier subset and the second carrier subset may include at least one carrier, and the carrier of the first carrier subset and the carrier of the second carrier subset may not be completely the same; and the terminal starts camping on the carrier of the second carrier subset from a first instant according to the signaling.

In the disclosure, the second instant may correspond to a sending subframe of the system information; and/or the second instant may correspond to a sending subframe of a paging channel.

In a possible implementation mode of the second aspect, the method may further include that: the terminal acquires the system information through the carrier of the second carrier subset after the first instant.

The signaling may include first configuration information indicating the carrier of the second carrier subset.

In the disclosure, the first configuration information may include a carrier index, center frequency index or bitmap indicating the carrier of the second carrier subset.

In a possible implementation mode of the second aspect, the signaling may include information indicating the first instant.

In a possible implementation mode of the second aspect, the signaling may include information indicating a cell from which the system information originates.

It is to be noted that, in the disclosure, the signaling may be carried by at least one of a broadcast channel, the system information, the paging channel, DCI in a CSS of a PDCCH in the sending subframe of the paging channel and DCI in a CSS of an EPDCCH in the sending subframe of the paging channel.

The carrier switching method of the second aspect is applied to a terminal in an idle state, the carrier set sharing the same set of system information is set, and when receiving an instruction indicating carrier switching from the base station, the terminal in the idle state camps on a new carrier belonging to the same carrier set with an old carrier, and performs necessary frequency and bandwidth adjustment in case of interference to an operating frequency, so that carrier switching may be implemented, and a user experience is improved.

A third aspect provides a carrier switching method, which may include that: a base station sends signaling to a terminal, the signaling indicating that the base station switches from a carrier of a first carrier subset to a carrier of a second carrier subset for operation, the first carrier subset and the second carrier subset both belonging to a preset carrier set, center frequencies and/or bandwidths of any two carriers in the preset carrier set being different, all carriers of the preset carrier set sharing the same set of system information, each of the first carrier subset and the second carrier subset including at least one carrier and the carrier of the first carrier subset and the carrier of the second carrier subset being not completely the same; and the base station starts operation on the carrier of the second carrier subset from a first instant.

In a possible implementation mode of the third aspect, the operation that the base station sends the signaling to the terminal may include that: the base station sends the signaling to the terminal on the carrier of the first carrier subset before the first instant through at least one of a broadcast channel, DCI in a CSS of a PDCCH, DCI in a CSS of an EPDCCH, DCI in a USS of the PDCCH, DCI in a USS of the EPDCCH, a dedicated physical channel, a MAC header, a MAC CE, system information of an RRC layer and dedicated signaling of the RRC layer.

In another possible implementation mode of the third aspect, the operation that the base station sends the signaling to the terminal may include that: the base station is switched back to the carrier of the first carrier subset to send the signaling to the terminal at a second instant after the first instant, wherein the base station may send the signaling to the terminal in at least one of the following manners: when the second instant corresponds to a sending subframe of the broadcast channel, the base station sends the signaling through the broadcast channel; when the second instant corresponds to a sending subframe of the system information, the base station sends the signaling through the system information; and when the second instant corresponds to a sending subframe of a paging channel, the base station sends the signaling through at least one of the paging channel, the DCI in the CSS of the PDCCH and the DCI in the CSS of the EPDCCH in the sending subframe of the paging channel.

The second instant may correspond to at least one of: first D sending subframe(s) of the broadcast channel after the first instant; first D sending subframe(s) of the system information after the first instant; aor first D sending subframe(s) of the paging channel after the first instant, wherein D may be a positive integer, and D may be predetermined by a protocol or configured by the base station.

In a possible implementation mode of the third aspect, the signaling may include information indicating the first instant.

In a possible implementation mode of the third aspect, the signaling may include information indicating a cell from which the system information originates.

In the disclosure, the signaling may include first configuration information indicating the carrier of the second carrier subset.

The first configuration information may include a carrier index, center frequency index or bitmap indicating the carrier of the second carrier subset.

In a possible implementation mode of the third aspect, the operation that the base station sends the signaling to the terminal may include that: the base station sends the signaling to the terminal in a subframe n on the carrier of the first carrier subset, wherein n may be a subframe index number; and the operation that the base station starts the operation on the carrier of the second carrier subset from the first instant may include that: the base station starts the operation on the carrier of the second carrier subset from a subframe n+N, wherein N may be a positive integer.

N may be a constant; or N may be determined according to a predetermined rule; or N may be configured by the base station.

In a possible implementation mode of the third aspect, N may be determined according to the predetermined rule, and the method may further include that: the base station transmits data in P continuous subframe(s), wherein P may be a positive integer, and the subframe n may be a subframe in the P continuous subframe(s); the operation that the base station starts the operation on the carrier of the second carrier subset from the first instant may include that: the base station judges whether a subframe n+Q is a subframe in the P continuous subframe(s) or not, wherein Q may be a positive integer and Q may be a constant; when the subframe n+Q is not a subframe in the P continuous subframe(s), it is determined that the subframe n+N is the subframe n+Q; when the subframe n+Q is a subframe in the P continuous subframe(s), it is determined that the subframe n+N is a Cth subframe after the P continuous subframe(s), wherein C may be a positive integer and C may be a constant; and the base station starts the operation on the carrier of the second carrier subset from the subframe n+N.

In a possible implementation mode of the third aspect, the method may further include that: the base station transmits data in P continuous subframe(s), wherein P may be a positive integer, and the subframe n and the subframe n+N may be subframes in the P continuous subframe(s); the operation that the base station starts the operation on the carrier of the second carrier subset from the first instant may include that: before the base station determines to occupy the carrier of the second carrier subset for data transmission, a signal or a physical channel is sent on the carrier of the second carrier subset to notify the terminal that the base station is intended to perform data transmission; the base station starts transmitting data on the carrier of the second carrier subset from the subframe n+N until an end of the P subframe(s); or the base station starts transmitting data on the carrier of the second carrier subset from the subframe n+N until an end of P+E subframe(s), wherein E may be a non-negative integer, and a value of E may be related to a length of an idle time-domain resource required by frequency switching; or the base station sends second configuration information on the carrier of the second carrier subset in the subframe n+N, the second configuration information indicating a number T of subframe(s) for continuous transmission, started from the subframe n+N, of the base station, wherein T may be a positive integer, and the base station starts transmitting data on the carrier of the second carrier subset from the subframe n+N until an end of the T subframe(s).

According to the carrier switching method of the third aspect, the carrier set sharing the same set of system information is set, and the base station switches to a new carrier belonging to the same carrier set with an old carrier, and indicates, through the signaling, the terminal to perform carrier switching and perform necessary frequency and bandwidth adjustment in case of interference to an operating frequency, so that carrier switching may be implemented, and a user experience is improved.

A fourth aspect provides a terminal, which may include a receiving module and a processing module and may be configured to execute the corresponding implementation modes of the first aspect, the second aspect and the third aspect.

A fifth aspect provides a terminal, which may include a processor, a transceiver and a memory and may be configured to execute the corresponding implementation modes of the first aspect, the second aspect and the third aspect, and moreover, each device of the terminal of the fifth aspect may correspond to a corresponding module of a terminal of the fourth aspect.

A sixth aspect provides a terminal, which may include a receiving module and a processing module and may be configured to execute the corresponding implementation modes of the first aspect, the second aspect and the third aspect.

A seventh aspect provides a terminal, which may include a processor, a transceiver and a memory and may be configured to execute the corresponding implementation modes of the first aspect, the second aspect and the third aspect, and moreover, each device of the terminal of the seventh aspect may correspond to a corresponding module of a terminal of the sixth aspect.

An eighth aspect provides a base station, which may include a sending module and a processing module and may be configured to execute the corresponding implementation modes of the first aspect, the second aspect and the third aspect.

A ninth aspect provides a base station, which may include a processor, a transceiver and a memory and may be configured to execute the corresponding implementation modes of the first aspect, the second aspect and the third aspect, and moreover, each device of the base station of the ninth aspect may correspond to a corresponding module of a base station of the eighth aspect.

BRIEF DESCRIPTION OF DRAWINGS

In order to describe the technical solutions of the embodiments of the disclosure more clearly, the drawings required to be used for descriptions about the embodiments or a conventional art will be simply introduced below. Obviously, the drawings described below are only some embodiments of the disclosure. For those skilled in the art, other drawings may further be obtained according to these drawings without creative work.

FIG. 2 illustrates a schematic flowchart of a carrier switching method according to an embodiment of the disclosure.

FIG. 5 illustrates a schematic flowchart of a carrier switching method according to another embodiment of the disclosure.

FIG. 6 illustrates a schematic flowchart of a carrier switching method according to another embodiment of the disclosure.

DETAILED DESCRIPTION

Figure 1:
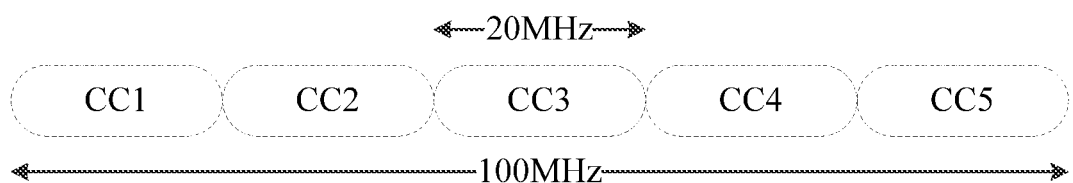
FIG. 1 illustrates a schematic diagram of an LTE CA technology.

The technical solutions in the embodiments of the disclosure will be clearly and completely described below in combination with the drawings in the embodiments of the disclosure. Obviously, the described embodiments are not all embodiments but part of embodiments of the disclosure. All other embodiments obtained by those skilled in the art on the basis of the embodiments in the disclosure without creative work fall within the scope of protection of the disclosure.

Terms "part", "module", "system" and the like used in the specification are adopted to represent a computer related entity, hardware, firmware, hardware and software combination, software or software in execution. For example, a part may be, but not limited to, a process running on a processor, the processor, an object, an executable file, an execution thread, a program and/or a computer. The drawings show that an application running on computing equipment and the computing equipment may both be parts. One or more parts may camp in a process and/or an execution thread, and the parts may be located on a computer and/or distributed between two or more computers. In addition, these parts may be executed from various computer-readable media with various data structures stored thereon. The parts may communicate through local and/or remote processes according to signals with one or more data groups (for example, data from two parts interacting with another part of a local system, a distributed system and/or a network, for example, the Internet interacting with another system through a signal).

It is to be understood that the technical solutions of the embodiments of the disclosure may be applied to various communication systems, for example: a Global System of Mobile Communication (GSM), a Code Division Multiple Access (CDMA) system, a Wideband Code Division Multiple Access (WCDMA) General Packet Radio Service (GPRS) system, an LTE system, an LTE Frequency Division Duplex (FDD) system, LTE Time Division Duplex (TDD), a Universal Mobile Telecommunication System (UMTS), a Worldwide Interoperability for Microwave Access (WiMAX) communication system and a future 5th-Generation (5G) communication system.

Each embodiment of the disclosure is described in combination with a terminal. The terminal may communicate with one or more core networks through a Radio Access Network (RAN), and the terminal may refer to UE, an access terminal, a user unit, a user station, a mobile radio station, a mobile station, a remote station, a remote terminal, mobile equipment, a user terminal, a terminal, wireless communication equipment, a user agent or a user device. The access terminal may be a cell phone, a cordless phone, a Session Initiation Protocol (SIP) phone, a Wireless Local Loop (WLL) station, a Personal Digital Assistant (PDA), handheld equipment with a wireless communication function, computing equipment or other processing equipment, vehicle-mounted equipment and wearable equipment connected to a wireless modem, a terminal in a future 5G network and the like.

Each embodiment of the disclosure is described in combination with a base station. The base station may be equipment configured to communicate with the terminal, for example, may be a Base Transceiver Station (BTS) in a GSM or CDMA, may also be a NodeB (NB) in a WCDMA system, and may further be an Evolutional Node B (eNB or eNodeB) in an LTE system. Or the base station may be a relay station, an access point, vehicle-mounted equipment, wearable equipment, network-side equipment in the future 5G network and the like.

Related technologies and concepts involved in the embodiments of the disclosure will be briefly introduced below.

CA technology:

along with development of a communication technology, an LTE-Advanced (LTE-A) technology is evolved from an LTE technology. In a Release 10 (R10) system of LTE-A, a CA technology is started to be used for bandwidth extension, that is, at most five LTE carriers Component Carrier 1 (CC1)-CCS illustrated in FIG. 1 may be aggregated to achieve a transmission bandwidth of maximally 100 MHz. According to a capability and transmitted data volume of a terminal, a base station may configure a number of carriers aggregated for transmission for each terminal equipment, and the aggregated carriers may be called as CCs.

For a terminal, multiple aggregated CCs include: (1) a PCell, wherein there is only one PCell, the terminal executes an initial connection establishment process or starts a connection reestablishment process on the PCell, the terminal receives a CSS of a PDCCH only on the PCell, and the terminal sends a Physical Uplink Control Channel (PUCCH) only on the PCell; and (2) SCells, wherein the other CCs except the PCell are all SCells, and the terminal may receive DCI and Physical Downlink Shared Channels (PDSCHs) on the SCells and send Physical Uplink Shared Channels (PUSCHs) on the SCells.

A method, terminal and base station of the embodiments of the disclosure may be applied to a scenario where no licensed carrier is used and an unlicensed carrier is independently used for operation (descriptions will be made below with this scenario as an example), and may also be applied to the abovementioned CA scenario, which will not be limited in the embodiments of the disclosure.

In the embodiments of the disclosure, a system may preset a carrier set S according to a carrier and bandwidth condition of a frequency band supported by it. The preset carrier set S may form a virtual cell, and the preset carrier set S includes carriers $\{ \ldots S_i, \ldots S_j, \ldots \}$. Center frequencies and/or bandwidths of any two carriers $S_i$ and $S_j$ ($i \neq j$) in the preset carrier set S are different.

For different carriers in the virtual cell, only one set of system information is sent, that is, all the carriers in the preset carrier set share the same set of system information. The terminal may obtain network information for cell selection network access according to the system information. The system information includes a Master Information Block (MIB), and the MIB includes configuration information such as system bandwidth information and a Physical Hybrid Automatic Repeat Request (ARQ) Indicator Channel (PHICH). The system information further includes a System Information Block Type 1 (SIB1), and the SIB1 includes a cell identifier, cell barring information, cell receiving level information and the like. The system information further includes a SIB2, and the SIB2 is mainly configured to define a parameter of each wireless channel. The system information may further include some other information, which will not be limited in the embodiments of the disclosure. The system information may be sent through multiple carriers in the preset carrier set S, or is sent by a certain carrier selected from the preset carrier set S. The system information may be sent in form of broadcast signaling, dedicated signaling or a combination of the broadcast signaling and the dedicated signaling, which will not be limited in the embodiments of the disclosure.

In an embodiment of the disclosure, the terminal is in a connected state. The connected state refers to that the terminal keeps a connection on a carrier(s). Keeping the connection refers to transmitting data between the terminal and the base station, or only keeping the connection with the base station without data transmission. In the embodiment of the disclosure, the terminal keeps the connection on a carrier(s) of a first carrier subset A, and the base station notifies the terminal that a service carrier is changed from the first carrier subset A to a second carrier subset B on the carrier(s) of the first carrier subset A through specific signaling, that is, the terminal is indicated to switch from the carrier(s) of the first carrier subset A to a carrier(s) of the second carrier subset B to keep the connection, wherein $A \in S$, $B \in S$ and $A \neq B$, that is, the first carrier subset A and the second carrier subset B both belong to the preset carrier set S, each of the first carrier subset A and the second carrier subset B includes at least one carrier, and the carrier(s) of the first carrier subset A and the carrier(s) of the second carrier subset B are not completely the same. In the embodiment of the disclosure, that the carrier(s) of the first carrier subset A and the carrier(s) of the second carrier subset B are not completely the same refers to that at least one of the carrier(s) of the first carrier subset A is different from the carrier(s) of the second carrier subset B.

The terminal starts keeping the connection on the carrier(s) of the second carrier subset B from a first instant $T_1$ according to the signaling. At this instant, all system information on the carrier(s) of the second carrier subset B connected with the terminal is kept consistent with system information on the carrier(s) of the first carrier subset A. Moreover, preferably, the terminal acquires the system information through the carrier(s) of the second carrier subset B after the first instant $T_1$.

FIG. 2 illustrates a schematic flowchart of a carrier switching method 200 according to an embodiment of the disclosure from the angle of a terminal in a connected state. The method 200 may include the following operations.

In S210, the terminal receives signaling sent by a base station on a carrier(s) of a first carrier subset, wherein the terminal currently keeps a connection on the carrier(s) of the first carrier subset, the signaling indicates the terminal to switch from the carrier(s) of the first carrier subset to a carrier(s) of a second carrier subset to keep the connection, the first carrier subset and the second carrier subset both belong to a preset carrier set, center frequencies and/or bandwidths of any two carriers in the preset carrier set are different, all carriers of the preset carrier set share the same set of system information, each of the first carrier subset and the second carrier subset includes at least one carrier, and the carrier(s) of the first carrier subset and the carrier(s) of the second carrier subset are not completely the same.

In S220, the terminal starts keeping the connection on the carrier(s) of the second carrier subset from a first instant according to the signaling.

According to the carrier switching method of the embodiment of the disclosure, the carrier set sharing the same set of system information is set, and when receiving an instruction indicating carrier switching from the base station, the terminal in the connected state keeps the connection on a new carrier(s) belonging to the same carrier set with an old carrier(s), and performs necessary frequency and bandwidth adjustment in case of interference to an operating frequency, so that carrier switching may be implemented, and a user experience is improved.

In the embodiment of the disclosure, the signaling may include first configuration information indicating the carrier(s) of the second carrier subset B. Multiple designs may be adopted for the first configuration information. For example, the first configuration information may include one or more carrier indexes, center frequency indexes, bitmaps or the like indicating the carrier(s) of the second carrier subset B.

In a specific example, an indication of the first configuration information may be configured as follows. The base station preconfigures the preset carrier set S $\{S_0, S_1, \ldots, S_{M-1}\}$ through broadcast information or high-layer signaling. When the preset carrier set S is configured, for each carrier $S_j$, at least the center frequency of the carrier is required to be configured. A system bandwidth of the carrier may be explicitly configured, and may also be predetermined.

The first configuration information indicates that one or more carriers in the preset carrier subset S form the second carrier subset B. The first configuration information may be indicated in a bitmap manner. For example: the preset carrier set S includes 8 elements $\{S_0, S_1, \ldots, S_7\}$, and if the first configuration information is set to be $\{1, 0, 0, 0, 0, 1, 0, 0\}$, it is indicated that the second carrier subset B is $\{S_0, S_6\}$.

The first configuration information may further indicate a carrier index in the preset carrier set S through $\lceil \log_2(M) \rceil$ (where $\lceil \ \rceil$ represents rounding-up), M being configured by the base station or predetermined by a protocol. For example: the preset carrier set S includes 8 elements $\{S_0, S_1, \ldots, S_7\}$, $\lceil \log_2(M) \rceil = 3$, and a mapping relationship of a frequency switching carrier indication field is illustrated in Table 1. If the first configuration information is set to be $\{0,0,0\ 1,1,0\}$, it is indicated that the second carrier subset B is $\{S_0, S_6\}$.

TABLE 1

Mapping Relationship of Frequency
Modulation Carrier Indication Field

| Frequency switching carrier indication field (a2, a1, a0) | Indicated carrier |
| --- | --- |
| 0, 0, 0 | $S_0$ |
| 0, 0, 1 | $S_1$ |
| 0, 1, 0 | $S_2$ |
| 0, 1, 1 | $S_3$ |
| 1, 0, 0 | $S_4$ |
| 1, 0, 1 | $S_5$ |
| 1, 1, 0 | $S_6$ |
| 1, 1, 1 | $S_7$ |

In another specific example, the base station preconfigures a center frequency set F $\{f_0, f_1, \ldots, f_{M-1}\}$ through broadcast information or high-layer signaling. Each element in the set F is different. A carrier is indicated through signaling formed by combining two parts of information, i.e. a center frequency selected from the set F and a corresponding system bandwidth. The first configuration information may include or more such combined signaling, wherein the center frequency may be indicated in the bitmap manner. A center frequency index in the set F may also be indicated through $\lceil \log_2(M) \rceil$ bits, M being configured by the base station or predetermined by the protocol. A specific implementation process is similar to an implementation process of the above example 1, and will not be elaborated herein.

In the embodiment of the disclosure, the signaling may be carried by at least one of a broadcast channel, DCI in a CSS of a PDCCH, DCI in a CSS of an EPDCCH, DCI in a USS of the PDCCH, DCI in a USS of the EPDCCH, a dedicated physical channel, a MAC header, a MAC CE, system information of an RRC layer and dedicated signaling of the RRC layer.

Specifically, a specific solution that the first configuration information is born through the DCI may be as follows. The first configuration information may be born through the DCI in the CSS. The DCI is scrambled through a dedicated Radio Network Temporary Identity (RNTI), wherein the dedicated RNTI is configured by the base station. A bit length of the DCI is the same as an existing DCI format 1A or DCI format 1C. The configuration information may also be born through the DCI in the USS. It is to be understood that the DCI in the embodiment of the disclosure may further be configured to schedule a PDSCH, a PUSCH or the like, which will not be limited in the embodiment of the disclosure.

When the first configuration information is born through the dedicated physical channel, the terminal determines a physical resource occupied by the dedicated physical channel in a manner of predetermination by the protocol, the physical resource may be related to the system bandwidth or part of parameters configured by the base station, but a specific resource location is not required to be notified through explicit signaling. For example, a physical resource determination method for a PHICH and a Physical Control Format Indicator Channel (PCFICH) in an LTE Release 8 (Rel-8) is used.

Compared with bearing of the first configuration information through the DCI, bearing of the first configuration information through the dedicated physical channel mainly has the following advantage: time for the base station to complete LBT detection of other carriers is different from time for completing data scheduling (namely, completing existing resource mapping of each physical channel), so that bearing the first configuration information with an independent dedicated physical channel may ensure that the first configuration information is sent as soon as possible without influence transmission of the other physical channels.

When being born through a MAC layer, the first configuration information may be born through the MAC header. In addition, the MAC header may further transmit various kinds of information related to a Protocol Data Unit (PDU) of the MAC layer, for example, a logical channel type and a logical channel number, which will not be limited in the embodiment of the disclosure. The first configuration information may further born through the MAC CE, and the MAC CE may further transmit a Buffer Status Report (BSR), Tracking Area (TA) information and the like, which will not be limited in the embodiment of the disclosure.

When being born through the RRC layer, the first configuration information may be born through the system information of the RRC layer, and for example, is born through an existing SIB message or a new SIB message. The first configuration information may further be born through the dedicated signaling of the RRC layer, for example, RRC reconfiguration signaling and RRC connection release signaling, which will not be limited in the embodiment of the disclosure.

Besides the above methods, an indication method for the first configuration information may further adopt an Evolved Universal Terrestrial Radio Access (E-UTRA) Absolute Radio Frequency Channel Number (EARFCN) indication manner, to indicate the center frequency and system bandwidth of each carrier in the second carrier subset B. A mode is as follows:

ARFCN1, Bandwidth1;
ARFCN2, Bandwidth2;
ARFCN3, Bandwidth3;
. . .

The terminal may specifically determine the first instant $T_1$ as follows. The operation that the terminal receives the signaling sent by the base station on the carrier(s) of the first carrier subset in S210 may include that: the terminal receives the signaling sent by the base station in a subframe n on the carrier(s) of the first carrier subset, wherein n is a subframe index number. The operation that the terminal starts keeping the connection on the carrier(s) of the second carrier subset from the first instant $T_1$ according to the signaling in S220 may include that: the terminal starts keeping the connection on the carrier(s) of the second carrier subset from a subframe n+N according to the signaling, wherein N is a positive integer.

It is to be understood that, in the embodiment of the disclosure, N is a constant; or N is determined according to a predetermined rule; or N is configured by the base station. Alternatively, as an embodiment, N is determined according to the predetermined rule, and the method 200 may further include that: the terminal determines that the base station transmits data in P continuous subframe(s), wherein P is a positive integer; the operation that the terminal receives the signaling sent by the base station on the carrier(s) of the first carrier subset in S210 may include that: the terminal receives the signaling sent by the base station in the subframe n on the carrier(s) of the first carrier subset, wherein the subframe n is a subframe in the P continuous subframe(s); the operation that the terminal starts keeping the connection on the carrier(s) of the second carrier subset from the first instant according to the signaling in S220 may include that: the terminal judges whether a subframe n+Q is a subframe in the P continuous subframe(s) or not, wherein Q is a positive integer and Q is a constant; when the subframe n+Q is not a subframe in the P continuous subframe(s), it is determined that the subframe n+N is the subframe n+Q; when the subframe n+Q is a subframe in the P continuous subframe(s), it is determined that the subframe n+N is a Cth subframe after the P continuous subframe(s), wherein C is a positive integer and C is a constant; and the terminal starts keeping the connection on the carrier(s) of the second carrier subset from the subframe n+N.

Specifically, a physical meaning of Q is a system processing delay, that is, Q is related to the system processing delay; and a physical meaning of C is a frequency switching processing delay, that is, C is related to the frequency switching processing delay. The base station determines to occupy the P continuous subframe(s) for data transmission, and the subframe n is one of the P continuous subframe(s). The base station judges whether the subframe n+Q is a subframe in the P continuous subframe(s) or not according to a subframe number Q corresponding to the system processing delay. If the subframe n+Q is not a subframe in the P continuous subframe(s), the base station determines that the subframe n+N is the subframe n+Q; and if the subframe n+Q is a subframe in the P continuous subframe(s), the base station determines that the subframe n+N is the Cth subframe after the P continuous subframe(s). The terminal continuously transmits multiple subframes to keep the connection on the second carrier subset B from the subframe n+N. That is, after switching, the base station continues keeps the connected state before switching on a new carrier(s).

Figure 3A:
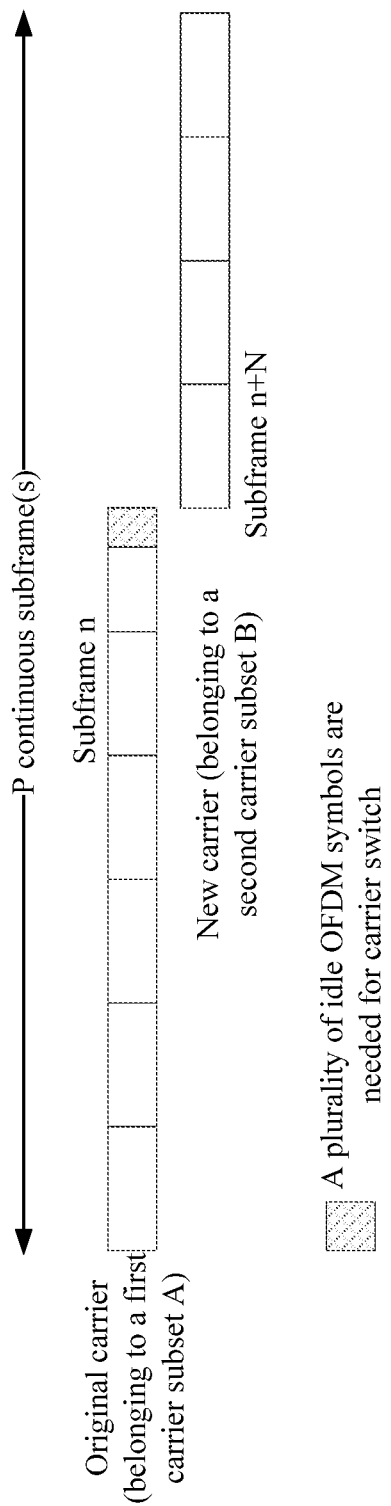
FIG. 3A and FIG. 3B illustrate schematic diagrams of carrier switching according to an embodiment of the disclosure respectively.
Figure 3B:
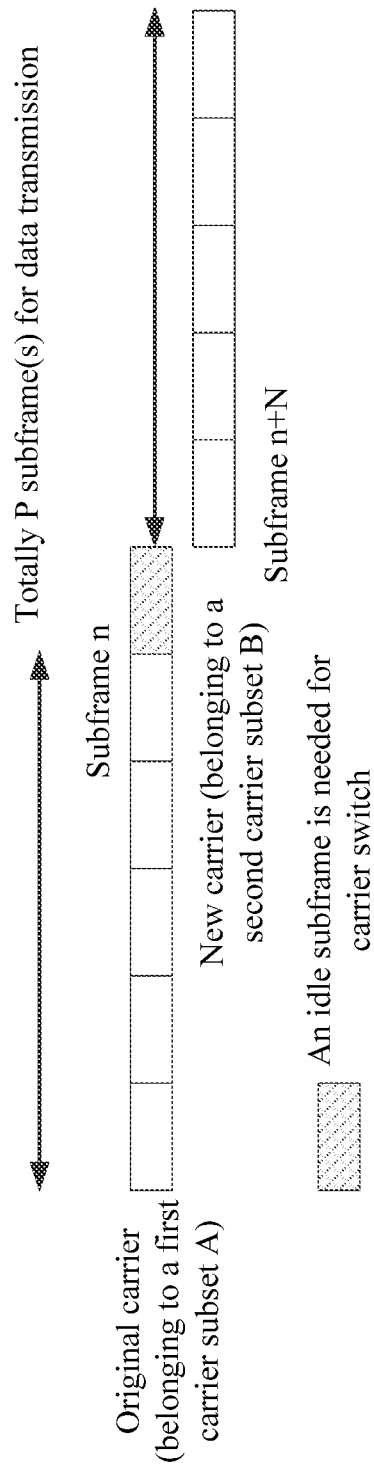

In a specific example, a number of subframe(s) configured for data transmission on the original carrier(s) and the new carrier(s) may be P. FIG. 3A illustrates the condition that a plurality of idle symbols (for example, Orthogonal Frequency Division Multiplexing (OFDM) symbols are required by carrier switching. FIG. 3B illustrates the condition that an idle subframe is required by carrier switching. It is to be understood that FIG. 3A and FIG. 3B are only schematic and not intended to form limits to the embodiment of the disclosure.

Figure 4A:
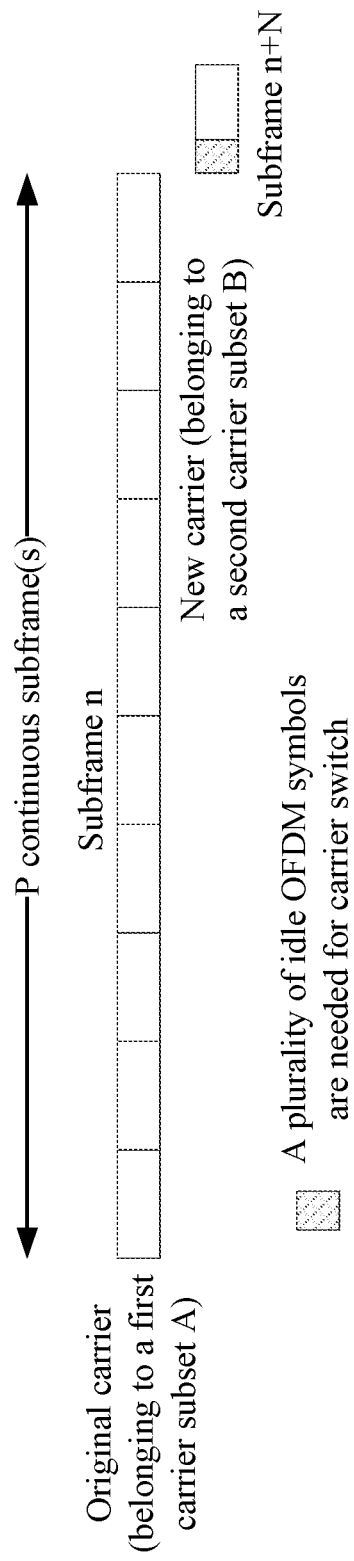
FIG. 4A and FIG. 4B illustrate schematic diagrams of carrier switching according to an embodiment of the disclosure respectively.
Figure 4B:
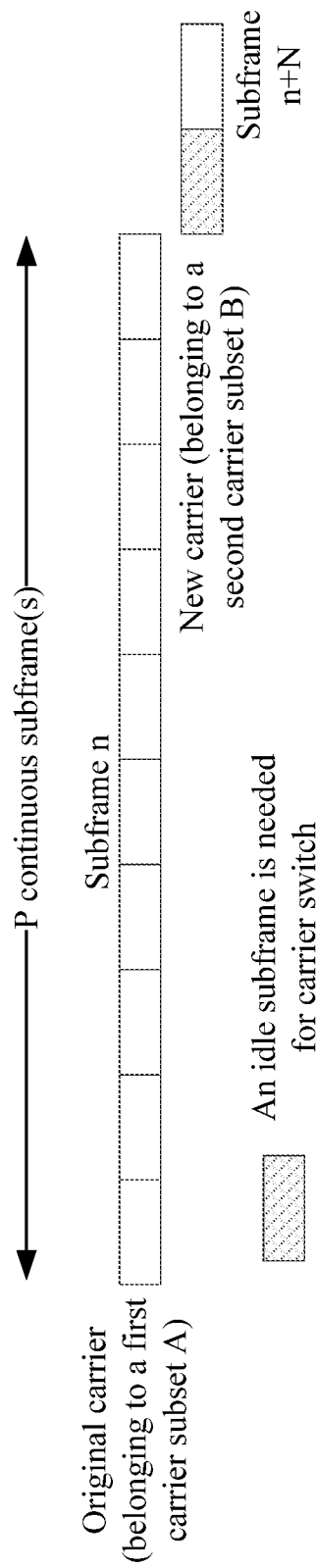

In another specific example, the base station determines to occupy the P continuous subframe(s) for data transmission, the subframe n is one of the P continuous subframe(s), and the subframe n+N is the Cth subframe after the P continuous subframe(s), and preferably, is a first or second subframe after the P continuous subframe(s). FIG. 4A illustrates the condition that a plurality of idle symbols are required by carrier switching. FIG. 4B illustrates the condition that an idle subframe is required by carrier switching. It is to be understood that FIG. 4A and FIG. 4B are only schematic and not intended to form limits to the embodiment of the disclosure.

In the embodiment of the disclosure, the method 200 may further include that: the terminal determines that the base station transmits data in P continuous subframe(s), wherein P is a positive integer, and the subframe n and the subframe n+N are subframes in the P continuous subframe(s); the operation that the terminal starts keeping the connection on the carrier(s) of the second carrier subset from the subframe n+N according to the signaling includes that: the terminal starts detecting a signal or physical channel sent by the base station on the carrier(s) of the second carrier subset from the subframe n+N, and determines whether the base station occupies the carrier(s) of the second carrier subset for data transmission or not; or the terminal starts detecting DCI and/or transmitted data on the carrier(s) of the second carrier subset from the subframe n+N until an end of the P subframe(s); or the terminal starts detecting DCI and/or transmitted data on the carrier(s) of the second carrier subset from the subframe n+N until an end of P+E subframe(s), wherein E is a non-negative integer, and a value of E is related to a length of an idle time-domain resource required by frequency switching; or the terminal receives second configuration information sent by the base station on the carrier(s) of the second carrier subset in the subframe n+N, the second configuration information indicating a number T of subframe(s) for continuous transmission, started from the subframe n+N, of the base station, wherein T is a positive integer, and the terminal starts detecting DCI and/or transmitted data on the carrier(s) of the second carrier subset from the subframe n+N until an end of the T subframe(s).

In another embodiment of the disclosure, the terminal is in an idle state. The idle state refers to that the terminal camps on a carrier(s). In the embodiment of the disclosure, the terminal camps on a carrier(s) of a first carrier subset A. A base station notifies the terminal that a service carrier(s) is(are) changed from the first carrier subset A to a second carrier subset B on the carrier(s) of the first carrier subset A through specific signaling at a second instant T2 (a instant when the terminal in the idle state may receive signaling, for example, a broadcast signaling scheduling instant or a paging message receiving instant), that is, the terminal is indicated to switch from the carrier(s) of the first carrier subset A to a carrier(s) of the second carrier subset B for camping, wherein A∈S, B∈S and A≠B. Understandings about A, B and S are consistent with the condition of the embodiment in which the terminal is in the connected state, and will not be elaborated herein.

The terminal starts camping on the carrier(s) of the second carrier subset B from a first instant $T_1$ according to the signaling. At this instant, all system information on the carrier(s) of the second carrier subset B connected with the terminal is kept consistent with system information on the carrier(s) of the first carrier subset A. Moreover, preferably, the terminal acquires the system information through the carrier(s) of the second carrier subset B after the first instant $T_1$.

FIG. 5 illustrates a schematic flowchart of a carrier switching method 500 according to an embodiment of the disclosure from the angle of a terminal in an idle state. The method 500 may include the following operations.

In S510, the terminal receives signaling sent by a base station at a second instant on a carrier(s) of a first carrier subset, wherein the terminal currently camps on the carrier(s) of the first carrier subset, the signaling indicates the terminal to switch from the carrier(s) of the first carrier subset to a carrier(s) of a second carrier subset for camping, the first carrier subset and the second carrier subset both belong to a preset carrier set, center frequencies and/or bandwidths of any two carriers in the preset carrier set are different, all carriers of the preset carrier set share the same set of system information, each of the first carrier subset and the second carrier subset includes at least one carrier, and the carrier of the first carrier subset and the carrier of the second carrier subset are not completely the same.

In S520, the terminal starts camping on the carrier(s) of the second carrier subset from a first instant according to the signaling.

According to the carrier switching method of the embodiment of the disclosure, the carrier set sharing the same set of system information is set, and when receiving an instruction indicating carrier switching from the base station, the terminal in the idle state camps on a new carrier(s) belonging to the same carrier set with an old carrier(s), and performs necessary frequency and bandwidth adjustment in case of interference to an operating frequency, so that carrier switching may be implemented, and a user experience is improved.

In the embodiment of the disclosure, the second instant T2 corresponds to a sending subframe of the system information; and/or the second instant T2 corresponds to a sending subframe of a paging channel. The second instant T2 may be a series of instants when the terminal in the idle state may receive the signaling.

In an embodiment, the base station transmits the signaling through a system message before implementing carrier switching. The signaling may include configuration information indicating the carrier(s) of the second carrier subset B. In addition, the signaling may further include information indicating the first instant $T_1$. The first instant $T_1$ may be configured to the terminal through signaling in an explicit manner, and the terminal and the base station may also predetermine a switching time, for example, after a plurality of subframes, in advance in an implicit predetermination manner.

It is to be understood that the first instants are described in both the embodiment where the terminal is in the idle state and the embodiment where the terminal is in the connected state, and the first instants in the two embodiments may be the same and may also be different, which will not be limited in the embodiment of the disclosure.

Before implementing carrier switching and/or after carrier switching, the base station may bear the signaling through a paging channel, or DCI in a CSS of a PDCCH in the sending subframe of the paging channel or DCI in a CSS of an EPDCCH in the sending subframe of the paging channel. The signaling may include first configuration information indicating the carrier(s) of the second carrier subset B. In addition, the signaling may further include information of a cell from which the system information originates. The information of the cell may include a Physical Cell Identifier (PCI), an Evolved Universal Terrestrial Radio Access Network (U-TRAN) Cell Global Identifier (ECGI) and the like to distinguish each piece of signaling or data sent by other cells accessed in a camping frequency band, wherein an E-UTRAN is an evolved universal terrestrial radio access network.

More specifically, the signaling may be sent in one or combination of multiple of the following manners. When the second instant corresponds to a sending subframe of a broadcast channel, the base station sends the signaling through the broadcast channel; when the second instant corresponds to the sending subframe of the system information, the base station sends the signaling through the system information; and when the second instant corresponds to the sending subframe of the paging channel, the base station sends the signaling through at least one of the paging channel, the DCI in the CSS of the PDCCH and the DCI in the CSS of the EPDCCH in the sending subframe of the paging channel.

As mentioned above, the first configuration information may be carried by at least one of the system information, the paging channel and the DCI of the CSS in the sending subframe of the paging channel. Similar to the embodiment where the terminal is in the connected state, the first configuration information may include one or more carrier indexes, center frequency indexes or bitmaps, each indicating a respective one the carrier(s) of the second carrier subset.

FIG. 6 illustrates a schematic flowchart of a carrier switching method 600 according to an embodiment of the disclosure from the angle of a base station. The method 600 may include the following operations.

In S610, the base station sends signaling to a terminal, the signaling indicating that the base station switches from a carrier(s) of a first carrier subset to a carrier(s) of a second carrier subset for operation, the first carrier subset and the second carrier subset both belonging to a preset carrier set, center frequencies and/or bandwidths of any two carriers in the preset carrier set being different, all carriers of the preset carrier set sharing the same set of system information, each of the first carrier subset and the second carrier subset including at least one carrier and the carrier(s) of the first carrier subset and the carrier(s) of the second carrier subset being not completely the same.

In S620, the base station starts operation on the carrier(s) of the second carrier subset from a first instant.

According to the carrier switching method of the embodiment of the disclosure, the carrier set sharing the same set of system information is set, and the base station switches to a new carrier(s) belonging to the same carrier set with an old carrier(s), and indicates, through the signaling, the terminal to perform carrier switching and perform necessary frequency and bandwidth adjustment in case of interference to an operating frequency, so that carrier switching may be implemented, and a user experience is improved.

Alternatively, in an embodiment, for a terminal in a connected state, the operation that the base station sends the signaling to the terminal in S610 may include that: the base station sends the signaling to the terminal on the carrier(s) of the first carrier subset before the first instant through at least one of a broadcast channel, DCI in a CSS of a PDCCH, DCI in a CSS of an EPDCCH, DCI in a USS of the PDCCH, DCI in a USS of the EPDCCH, a dedicated physical channel, a MAC header, a MAC CE, system information of an RRC layer and dedicated signaling of the RRC layer. Alternatively, in another embodiment, for a terminal in an idle state, the operation that the base station sends the signaling to the terminal in S610 may include that: the base station switches back to the carrier(s) of the first carrier subset to send the signaling to the terminal at a second instant after the first instant, wherein the base station sends the signaling to the terminal in at least one of the following manners: when the second instant corresponds to a sending subframe of the broadcast channel, the base station sends the signaling through the broadcast channel; when the second instant corresponds to a sending subframe of the system information, the base station sends the signaling through the system information; and when the second instant corresponds to a sending subframe of a paging channel, the base station sends the signaling through at least one of the paging channel, the DCI in the CSS of the PDCCH and the DCI in the CSS of the EPDCCH in the sending subframe of the paging channel.

The second instant corresponds to at least one of: first D sending subframe(s) of the broadcast channel after the first instant; first D sending subframe(s) of the system information after the first instant; or first D sending subframe(s) of the paging channel after the first instant, wherein D is a positive integer, and D is predetermined by a protocol or configured by the base station.

For the terminal in the idle state, the signaling includes information indicating the first instant. Specifically, the signaling may include information indicating the first instant when the terminal starts camping on the carrier(s) of the second carrier subset.

For the terminal in the idle state, the signaling may include information indicating a cell from which the system information originates.

In the embodiment of the disclosure, the signaling includes first configuration information indicating the carrier(s) of the second carrier subset.

In the embodiment of the disclosure, the first configuration information may include one or more carrier indexes, center frequency indexes or bitmaps, each indicating a respective one of the carrier(s) of the second carrier subset.

In the embodiment of the disclosure, the operation that the base station sends the signaling to the terminal in S610 may include that: the base station sends the signaling to the terminal in a subframe n on the carrier(s) of the first carrier subset, wherein n is a subframe index number; and the operation that the base station starts the operation on the carrier(s) of the second carrier subset from the first instant in S620 includes that: the base station starts the operation on the carrier(s) of the second carrier subset from a subframe n+N, wherein N is a positive integer.

N is a constant; or N is determined according to a predetermined rule; or N is configured by the base station.

In an embodiment, N is determined according to the predetermined rule, and the method 600 further includes that: the base station transmits data in P continuous subframe(s), wherein P is a positive integer, and the subframe n is a subframe in the P continuous subframe(s); the operation that the base station starts the operation on the carrier(s) of the second carrier subset from the first instant in S620 includes that: the base station judges whether a subframe n+Q is a subframe in the P continuous subframe(s) or not, wherein Q is a positive integer and Q is a constant; when the subframe n+Q is not a subframe in the P continuous subframe(s), it is determined that the subframe n+N is the subframe n+Q; when the subframe n+Q is a subframe in the P continuous subframe(s), it is determined that the subframe n+N is a Cth subframe after the P continuous subframe(s), wherein C may be a positive integer and C may be a constant; and the base station starts the operation on the carrier(s) of the second carrier subset from the subframe n+N.

In a specific embodiment, the method 600 further includes that: the base station transmits data in P continuous subframe(s), wherein P is a positive integer, and the subframe n and the subframe n+N are subframes in the P continuous subframe(s); the operation that the base station starts the operation on the carrier(s) of the second carrier subset from the first instant in S620 includes that: before the base station determines to occupy the carrier(s) of the second carrier subset for data transmission, a signal or a physical channel is sent on the carrier(s) of the second carrier subset to notify the terminal that the base station is intended to perform data transmission; the base station starts transmitting data on the carrier(s) of the second carrier subset from the subframe n+N until an end of the P subframe(s); or the base station starts transmitting data on the carrier(s) of the second carrier subset from the subframe n+N until an end of P+E subframe(s), wherein E is a non-negative integer, and a value of E is related to a length of an idle time-domain resource required by frequency switching; or the base station sends second configuration information on the carrier(s) of the second carrier subset in the subframe n+N, the second configuration information indicating a number T of subframe(s) for continuous transmission, started from the subframe n+N, of the base station wherein T is a positive integer, and the base station starts transmitting data on the carrier(s) of the second carrier subset from the subframe n+N until an end of the T subframe(s).

That is, after the base station implements carrier switching, the base station may continue transmitting data according to the abovementioned forms. Of course, after switching to the second carrier subset B, the base station may further stop transmitting left data which is not completely transmitted this time for transmission next time, which will not be limited in the embodiment of the disclosure.

It is to be understood that, in each embodiment of the disclosure, a magnitude of a sequence number of each process does not refer to an execution sequence, and an execution sequence of each process should be determined according to its function and internal logic and not form any limit to an implementation process of the embodiment of the disclosure.

The carrier switching method of the embodiments of the disclosure is described above in detail, and a terminal and base station of the embodiments of the disclosure will be described below.

Figure 7:
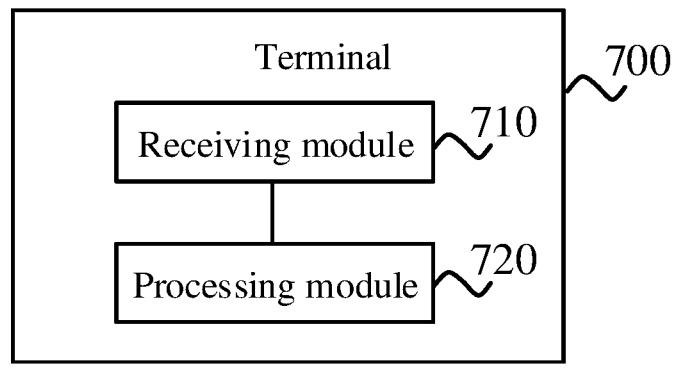
FIG. 7 illustrates a schematic block diagram of a terminal according to an embodiment of the disclosure.

FIG. 7 illustrates a schematic block diagram of a terminal 700 according to an embodiment of the disclosure. The terminal 700 is a terminal in a connected state, and the terminal 700 includes a receiving module 710 and a processing module 720.

The receiving module 710 is configured to receive signaling sent by a base station on a carrier(s) of a first carrier subset, wherein the terminal currently keeps a connection on the carrier(s) of the first carrier subset, the signaling indicates the terminal to switch from the carrier(s) of the first carrier subset to a carrier(s) of a second carrier subset to keep the connection, the first carrier subset and the second carrier subset both belong to a preset carrier set, center frequencies and/or bandwidths of any two carriers in the preset carrier set are different, all carriers of the preset carrier set share the same set of system information, each of the first carrier subset and the second carrier subset includes at least one carrier, and the carrier(s) of the first carrier subset and the carrier(s) of the second carrier subset are not completely the same.

The processing module 720 is configured to start keeping the connection on the carrier(s) of the second carrier subset from a first instant according to the signaling received by the receiving module 710.

According to the embodiment of the disclosure, the carrier set sharing the same set of system information is set, and when receiving an instruction indicating carrier switching from the base station, the terminal in the connected state keeps the connection on a new carrier(s) belonging to the same carrier set with an old carrier(s), and performs necessary frequency and bandwidth adjustment in case of interference to an operating frequency, so that carrier switching may be implemented, and a user experience is improved.

Alternatively, as an embodiment, the receiving module 710 may further be configured to: acquire the system information through the carrier(s) of the second carrier subset after the first instant.

Alternatively, as an embodiment, the signaling of the disclosure includes first configuration information indicating the carrier(s) of the second carrier subset.

Alternatively, as an embodiment, the first configuration information includes one or more carrier indexes, center frequency indexes or bitmaps, each indicating a respective one of the carrier(s) of the second carrier subset.

Alternatively, as an embodiment, the receiving module 710 may specifically be configured to: receive the signaling sent by the base station in a subframe n on the carrier(s) of the first carrier subset, wherein n is a subframe index number; and the processing module 720 may specifically be configured to: start keeping the connection on the carrier(s) of the second carrier subset from a subframe n+N according to the signaling, wherein N is a positive integer.

Alternatively, as an embodiment, N is a constant; or N is determined according to a predetermined rule; or N is configured by the base station.

Alternatively, as an embodiment, the signaling is carried by at least one of a broadcast channel, DCI in a CSS of a PDCCH, DCI in a CSS of an EPDCCH, DCI in a USS of the PDCCH, DCI in a USS of the EPDCCH, a dedicated physical channel, a MAC header, a MAC CE, system information of an RRC layer and dedicated signaling of the RRC layer.

Alternatively, as an embodiment, N is determined according to the predetermined rule, and the processing module 720 may further be configured to: determine that the base station transmits data in P continuous subframe(s), wherein P is a positive integer; the receiving module 710 may specifically be configured to: receive the signaling sent by the base station in the subframe n on the carrier(s) of the first carrier subset, wherein the subframe n is a subframe in the P continuous subframe(s); the processing module 720 may specifically be configured to: judge whether a subframe n+Q is a subframe in the P continuous subframe(s) or not, wherein Q is a positive integer and Q is a constant; when the subframe n+Q is not a subframe in the P continuous subframe(s), determine that the subframe n+N is the subframe n+Q; when the subframe n+Q is a subframe in the P continuous subframe(s), determine that the subframe n+N is a Cth subframe after the P continuous subframe(s), wherein C is a positive integer and C is a constant; and start keeping, by the terminal, the connection on the carrier(s) of the second carrier subset from the subframe n+N.

Alternatively, as an embodiment, the processing module 720 may further be configured to: determine that the base station transmits data in P continuous subframe(s), wherein P is a positive integer, and the subframe n and the subframe n+N are subframes in the P continuous subframe(s); the receiving module 720 may specifically be configured to: start detecting a signal or physical channel sent by the base station on the carrier(s) of the second carrier subset from the subframe n+N, and determine whether the base station occupies the carrier(s) of the second carrier subset for data transmission or not; or start detecting DCI and/or transmitted data on the carrier(s) of the second carrier subset from the subframe n+N until an end of the P subframe(s); or start detecting DCI and/or transmitted data on the carrier(s) of the second carrier subset from the subframe n+N until an end of P+E subframe(s), wherein E is a non-negative integer, and a value of E is related to a length of an idle time-domain resource required by frequency switching; or receive second configuration information sent by the base station on the carrier(s) of the second carrier subset in the subframe n+N, the second configuration information indicating a number T of subframe(s) for continuous transmission, started from the subframe n+N, of the base station, wherein T is a positive integer, and start detecting DCI and/or transmitted data on the carrier(s) of the second carrier subset from the subframe n+N until an end of the T subframe(s).

Figure 8:
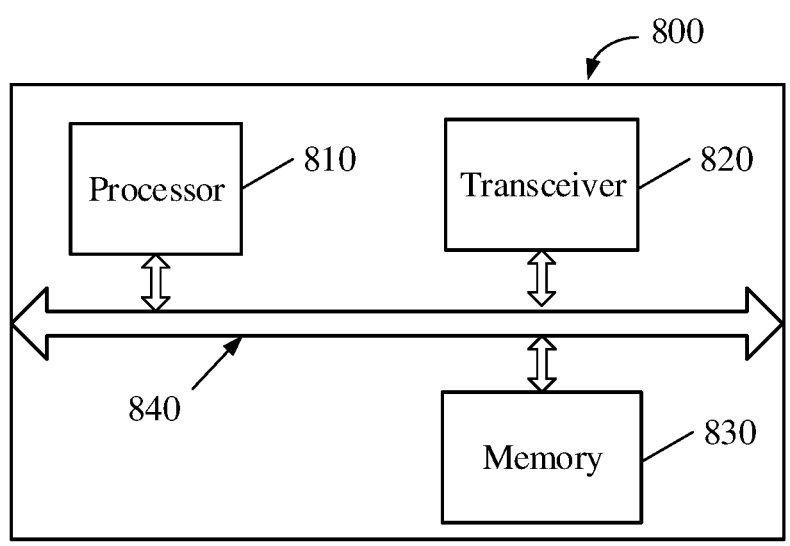
FIG. 8 illustrates a schematic block diagram of a terminal according to another embodiment of the disclosure.

It is to be noted that, in the embodiment of the disclosure, the receiving module 710 may be implemented by a transceiver, and the processing module 720 may be implemented by a processor. As illustrated in FIG. 8, a terminal 800 may include a processor 810, a transceiver 820 and a memory 830, wherein the memory 830 may be configured to store codes executed by the processor 810 and the like.

Each component in the terminal 800 is coupled together through a bus system 840, wherein the bus system 840 includes a data bus, and further includes a power bus, a control bus and a state signal bus.

The terminal 700 illustrated in FIG. 7 or the terminal 800 illustrated in FIG. 8 may implement each process implemented in the embodiments illustrated in FIG. 1 to FIG. 6, which will not be elaborated herein to avoid repetition.

It is to be noted that the method embodiments of the disclosure may be applied to a processor or implemented by the processor. The processor may be an integrated circuit chip with a signal processing capability. In an implementation process, each step of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any conventional processor and the like. The operations of the methods disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the operations of the methods in combination with hardware.

It can be understood that the memory in the embodiment of the disclosure may be a volatile memory or a nonvolatile memory, or may include both the volatile and nonvolatile memories, wherein the nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

Figure 9:
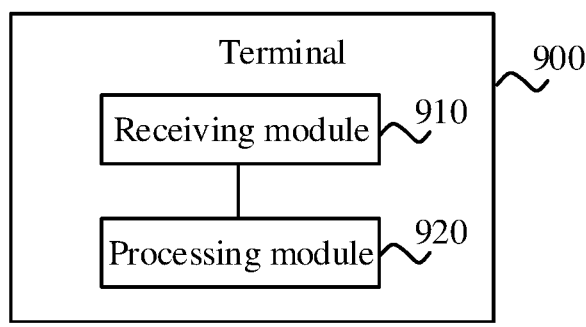
FIG. 9 illustrates a schematic block diagram of a terminal according to another embodiment of the disclosure.

FIG. 9 illustrates a schematic block diagram of a terminal 900 according to an embodiment of the disclosure. The terminal 900 is a terminal in an idle state, and the terminal 900 includes a receiving module 910 and a processing module 920.

The receiving module 910 is configured to receive signaling sent by a base station at a second instant on a carrier(s) of a first carrier subset, wherein the terminal currently camps on the carrier(s) of the first carrier subset, the signaling indicates the terminal to switch from the carrier(s) of the first carrier subset to a carrier(s) of a second carrier subset for camping, the first carrier subset and the second carrier subset both belong to a preset carrier set, center frequencies and/or bandwidths of any two carriers in the preset carrier set are different, all carriers of the preset carrier set share the same set of system information, each of the first carrier subset and the second carrier subset includes at least one carrier, and the carrier(s) of the first carrier subset and the carrier(s) of the second carrier subset are not completely the same.

The processing module 920 is configured to start camping on the carrier(s) of the second carrier subset from a first instant according to the signaling received by the receiving module.

According to the embodiment of the disclosure, the carrier set sharing the same set of system information is set, and when receiving an instruction indicating carrier switching from the base station, the terminal in the idle state camps on a new carrier(s) belonging to the same carrier set with an old carrier(s), and performs necessary frequency and bandwidth adjustment in case of interference to an operating frequency, so that carrier switching may be implemented, and a user experience is improved.

Alternatively, as an embodiment, the second instant corresponds to a sending subframe of the system information; and/or the second instant corresponds to a sending subframe of a paging channel.

Alternatively, as an embodiment, the receiving module 910 is further configured to: acquire the system information through the carrier(s) of the second carrier subset after the first instant.

Alternatively, as an embodiment, the signaling includes first configuration information indicating the carrier(s) of the second carrier subset.

Alternatively, as an embodiment, the first configuration information includes one or more carrier indexes, center frequency indexes or bitmaps, each indicating a respective one of the carrier(s) of the second carrier subset.

Alternatively, as an embodiment, the signaling includes information indicating the first instant.

Alternatively, as an embodiment, the signaling includes information indicating a cell from which the system information originates.

Alternatively, as an embodiment, the signaling is carried by at least one of a broadcast channel, the system information, the paging channel, DCI in a CSS of a PDCCH in the sending subframe of the paging channel and DCI in a CSS of an EPDCCH in the sending subframe of the paging channel.

Figure 10:
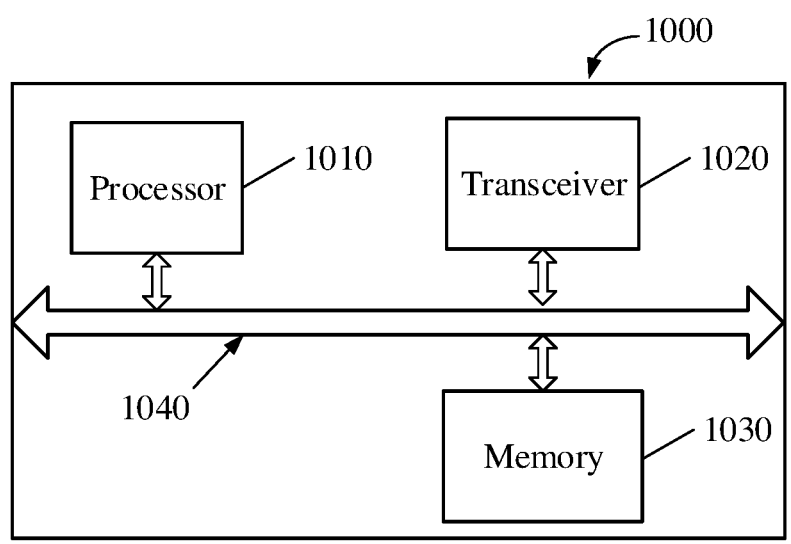
FIG. 10 illustrates a schematic block diagram of a terminal according to another embodiment of the disclosure.

It is to be noted that, in the embodiment of the disclosure, the receiving module 910 may be implemented by a transceiver, and the processing module 920 may be implemented by a processor. As illustrated in FIG. 10, a terminal 1000 may include a processor 1010, a transceiver 1020 and a memory 1030, wherein the memory 1030 may be configured to store codes executed by the processor 1010 and the like.

Each component in the terminal 1000 is coupled together through a bus system 1040, wherein the bus system 1040 includes a data bus, and further includes a power bus, a control bus and a state signal bus.

The terminal 900 illustrated in FIG. 9 or the terminal 1000 illustrated in FIG. 10 may implement each process implemented in the embodiments illustrated in FIG. 1 to FIG. 6, which will not be elaborated herein to avoid repetition.

Figure 11:
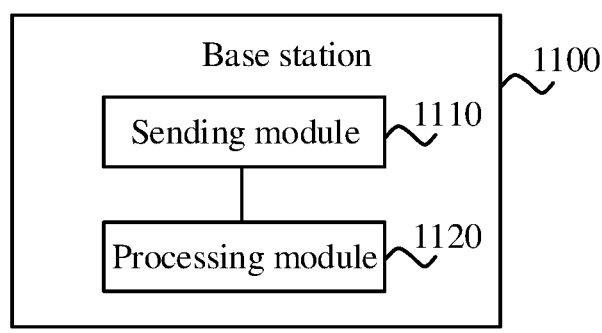
FIG. 11 illustrates a schematic block diagram of a base station according to an embodiment of the disclosure.

FIG. 11 illustrates a schematic block diagram of a base station 1100 according to an embodiment of the disclosure. The base station 1000 includes a sending module 1110 and a processing module 1120.

The sending module 1110 is configured to send signaling to a terminal, the signaling indicating that the base station switches from a carrier(s) of a first carrier subset to a carrier(s) of a second carrier subset for operation, the first carrier subset and the second carrier subset both belonging to a preset carrier set, center frequencies and/or bandwidths of any two carriers in the preset carrier set being different, all carriers of the preset carrier set sharing the same set of system information, each of the first carrier subset and the second carrier subset including at least one carrier and the carrier(s) of the first carrier subset and the carrier(s) of the second carrier subset being not completely the same.

The processing module 1120 is configured to start operation on the carrier(s) of the second carrier subset from a first instant.

According to the embodiment of the disclosure, the carrier set sharing the same set of system information is set, and the base station switches to a new carrier(s) belonging to the same carrier set with an old carrier(s), and indicates, through the signaling, the terminal to perform carrier switching and perform necessary frequency and bandwidth adjustment in case of interference to an operating frequency, so that carrier switching may be implemented, and a user experience is improved.

Alternatively, as an embodiment, the sending module 1110 may specifically be configured to: send the signaling to the terminal on the carrier(s) of the first carrier subset before the first instant through at least one of a broadcast channel, DCI in a CSS of a PDCCH, DCI in a CSS of an EPDCCH, DCI in a USS of the PDCCH, DCI in a USS of the EPDCCH, a dedicated physical channel, a MAC header, a MAC CE, system information of an RRC layer and dedicated signaling of the RRC layer.

Alternatively, as an embodiment, the sending module 1110 may specifically be configured to: switch the base station back to the carrier(s) of the first carrier subset to send the signaling to the terminal at a second instant after the first instant, wherein the sending module sends the signaling to the terminal in at least one of the following manners: when the second instant corresponds to a sending subframe of the broadcast channel, the signaling is sent through the broadcast channel; when the second instant corresponds to a sending subframe of the system information, the signaling is sent through the system information; and when the second instant corresponds to a sending subframe of a paging channel, the signaling is sent through at least one of the paging channel, the DCI in the CSS of the PDCCH and the DCI in the CSS of the EPDCCH in the sending subframe of the paging channel.

Wherein, the second instant corresponds to at least one of:

first D sending subframe(s) of the broadcast channel after the first instant;

first D sending subframe(s) of the system information after the first instant; and first D sending subframe(s) of the paging channel after the first instant, wherein D is a positive integer, and D is predetermined by a protocol or configured by the base station.

Alternatively, as an embodiment, the signaling includes information indicating the first instant.

Alternatively, as an embodiment, the signaling includes information indicating a cell from which the system information originates.

Alternatively, as an embodiment, the signaling includes first configuration information indicating the carrier(s) of the second carrier subset.

Alternatively, as an embodiment, the first configuration information includes one or more carrier indexes, center frequency indexes or bitmaps indicating the carrier(s) of the second carrier subset.

Alternatively, as an embodiment, the sending module 1110 may specifically be configured to: send the signaling to the terminal in a subframe n on the carrier(s) of the first carrier subset, wherein n is a subframe index number; and the processing module 1120 may specifically be configured to: start the operation on the carrier(s) of the second carrier subset from a subframe n+N, wherein N is a positive integer.

N is a constant; or N is determined according to a predetermined rule; or N is configured by the base station. Alternatively, as an embodiment, N is determined according to the predetermined rule, and the sending module 1110 may further be configured to: transmit data in P continuous subframe(s), wherein P is a positive integer, and the subframe n is a subframe in the P continuous subframe(s); the processing module 1120 may specifically be configured to: judge whether a subframe n+Q is a subframe in the P continuous subframe(s) or not, wherein Q is a positive integer and Q is a constant; when the subframe n+Q is not a subframe in the P continuous subframe(s), determine that the subframe n+N is the subframe n+Q; when the subframe n+Q is a subframe in the P continuous subframe(s), determine that the subframe n+N is a Cth subframe after the P continuous subframe(s), wherein C is a positive integer and C is a constant; and start the operation on the carrier(s) of the second carrier subset from the subframe n+N.

Alternatively, as an embodiment, the sending module 1110 may further be configured to: transmit, by the base station, data in P continuous subframe(s), wherein P is a positive integer, and the subframe n and the subframe n+N are subframes in the P continuous subframe(s); the processing module 1120 may specifically be configured to: before the base station determines to occupy the carrier(s) of the second carrier subset for data transmission, send a signal or a physical channel on the carrier(s) of the second carrier subset to notify the terminal that the base station is intended to perform data transmission; start transmitting data on the carrier(s) of the second carrier subset from the subframe n+N until an end of the P subframe(s); or start transmitting data on the carrier(s) of the second carrier subset from the subframe n+N until an end of P+E subframe(s), wherein E is a non-negative integer, and a value of E is related to a length of an idle time-domain resource required by frequency switching; or send second configuration information on the carrier(s) of the second carrier subset in the subframe n+N, the second configuration information indicating a number T of subframe(s) for continuous transmission, started from the subframe n+N, of the base station, wherein T is a positive integer, and start transmitting data on the carrier(s) of the second carrier subset from the subframe n+N until an end of the T subframe(s).

Figure 12:
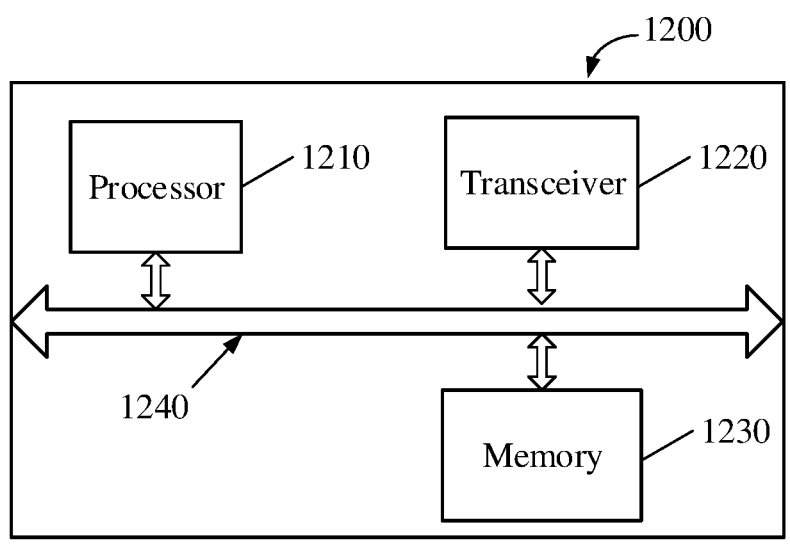
FIG. 12 illustrates a schematic block diagram of a base station according to another embodiment of the disclosure.

It is to be noted that, in the embodiment of the disclosure, the sending module 1110 may be implemented by a transceiver, and the processing module 1120 may be implemented by a processor. As illustrated in FIG. 12, a base station 1200 may include a processor 1210, a transceiver 1220 and a memory 1230, wherein the memory 1230 may be configured to store codes executed by the processor 1210 and the like.

Each component in the base station 1200 is coupled together through a bus system 1240, wherein the bus system 1240 includes a data bus, and further includes a power bus, a control bus and a state signal bus.

The base station 1100 illustrated in FIG. 11 or the base station 1200 illustrated in FIG. 12 may implement each process implemented in the embodiments illustrated in FIG. 1 to FIG. 6, which will not be elaborated herein to avoid repetition.

Those skilled in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solution. Those skilled in the art may realize the described functions for each specific application by virtue of different methods, but such realization shall fall within the scope of the disclosure.

Those skilled in the art may clearly learn about that specific operating processes of the system, device and unit described above may refer to the corresponding processes in the method embodiment for convenient and brief description and will not be elaborated herein.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two unit may also be integrated into a unit.

When being implemented in form of software function unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a piece of computer equipment (which may be a personal computer, a server, network equipment or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A carrier switching method, comprising:
receiving, by a terminal, signaling sent by a base station in a time unit n on a first carrier subset, wherein n is a time unit index number, and the terminal currently transmits data or camps on the first carrier subset, the signaling indicates the terminal to switch from the first carrier subset to a second carrier subset to transmit data or camp, both the first carrier subset and the second carrier subset belong to a preset carrier set, any two carriers in the preset carrier set are different from each other in terms of at least one of center frequency or bandwidth, the preset carrier set has a set of system information, each of the first carrier subset and the second carrier subset comprises at least one carrier, and the first carrier subset and the second carrier subset are not completely the same; and
starting transmitting data or camping, by the terminal, on the second carrier subset from a first instant according to the signaling,
wherein the starting transmitting, by the terminal, data on the second carrier subset from the first instant according to the signaling comprises:
starting detecting, by the terminal, a signal or physical channel sent by the base station on the second carrier subset from time unit n+N, and determining whether the base station occupies one or more carriers of the second carrier subset for data transmission, wherein N is a positive integer; or
in response to that the base station transmits data in P continuous time units, and the time unit n and the time unit n+N are time units in the P continuous time units, starting detecting, by the terminal, at least one of DCI or transmitted data on the second carrier subset from the time unit n+N until an end of the P continuous time units, wherein P is a positive integer, and N is a positive integer; or
in response to that the base station transmits data in P continuous time units, and the time unit n and the time unit n+N are time units in the P continuous time units, starting detecting, by the terminal, at least one of DCI or transmitted data on the second carrier subset from the time unit n+N until an end of a number P+E of one or more time units, wherein E is a non-negative integer, a value of E is associated with a length of an idle time-domain resource required by frequency modulation, P is a positive integer, and N is a positive integer; or
receiving, by the terminal, second configuration information sent by the base station on the second carrier subset in the time unit n+N, the second configuration information indicating a time T of one or more time units for continuous transmission, started from the time unit n+N, of the base station, wherein T is a positive number, and starting, by the terminal, at least one of detecting DCI or transmitted data on the second carrier subset from the time unit n+N until an end of the time T of the one or more time units, wherein N is a positive integer.

2. The method according to claim 1, wherein the signaling comprises first configuration information indicating the second carrier subset.

3. The method according to claim 2, wherein the first configuration information comprises one of the following: one or more carrier indexes, center frequency indexes or bitmaps, each indicating a respective one of one or more carriers of the second carrier subset.

4. The method according to claim 3, wherein the preset carrier set is preconfigured by the base station through broadcast information or high-level signaling as a preset carrier set S $\{S_0, S_1, \ldots, S_{M-1}\}$, and M is a positive integer greater than or equal to 2.

5. The method according to claim 4, wherein each carrier of the preset carrier set S $\{S_0, S_1, \ldots, S_{M-1}\}$ is at least configured a center frequency.

6. The method according to claim 5, wherein the first configuration information indicates a carrier index in the preset carrier set S $\{S_0, S_1, \ldots, S_{M-1}\}$ through $\lceil \log_2(M) \rceil$ bits, and $\lceil \ \rceil$ represents rounding-up.

7. The method according to claim 1, wherein the signaling is carried in at least one of a broadcast channel, Downlink Control Information (DCI) in a Common Search Space (CSS) of a Physical Downlink Control Channel (PDCCH), DCI in a CSS of an Enhanced PDCCH (EPDCCH), DCI in a User Equipment (UE)-specific Search Space (USS) of the PDCCH, DCI in a USS of the EPDCCH, a dedicated physical channel, a Media Access Control (MAC) header, a MAC Control Element (CE), system information of a Radio Resource Control (RRC) layer and dedicated signaling of the RRC layer.

8. The method according to claim 1, wherein in a case that the terminal currently transmits data or camps on the first carrier subset, the receiving, by the terminal, the signaling sent by the base station on the first carrier subset comprises:
receiving, by the terminal, signaling sent by the base station at a second instant on the first carrier subset;

wherein the second instant corresponds to at least one of a sending subframe of the system information or a sending subframe of a paging channel.

9. A terminal, comprising:

a transceiver, configured to receive signaling sent by a base station in a time unit n on a first carrier subset, wherein n is a time unit index number, and the terminal currently transmits data or camps on the first carrier subset, the signaling indicates the terminal to switch from the first carrier subset to a second carrier subset to transmit data or camp, both the first carrier subset and the second carrier subset belong to a preset carrier set, any two carriers in the preset carrier set are different from each other in terms of at least one of center frequency or bandwidth, the preset carrier set has a set of system information, each of the first carrier subset and the second carrier subset comprises at least one carrier, and the first carrier subset and the second carrier subset are not completely the same; and a processor, configured to start transmitting data or camping on the second carrier subset from a first instant according to the signaling received by the transceiver, wherein the processor is configured to:

start detecting a signal or physical channel sent by the base station on the second carrier subset from time unit n+N, and determining whether the base station occupies one or more carriers of the second carrier subset for data transmission or not, wherein N is a positive integer; or in response to that the base station transmits data in P continuous time units, and the time unit n and the time unit n+N are time units in the P continuous time units, start detecting at least one of DCI or transmitted data on the second carrier subset from the time unit n+N until an end of the P continuous time units, wherein P is a positive integer, and N is a positive integer; or in response to that the base station transmits data in a P continuous time units, and the time unit n and the time unit n+N are time units in the P continuous time units, start detecting at least one of DCI or transmitted data on the second carrier subset from the time unit n+N until an end of a number P+E of one or more time units, wherein E is a non-negative integer, a value of E is associated with a length of an idle time-domain resource required by frequency modulation, P is a positive integer, and N is a positive integer; or receive second configuration information sent by the base station on the second carrier subset in the time unit n+N, the second configuration information indicating a time T of one or more time units for continuous transmission, started from the time unit n+N, of the base station, wherein T is a positive number, and start at least one of detecting DCI or transmitted data on the second carrier subset from the time unit n+N until an end of the time T of the one or more time units, wherein N is a positive integer.

10. The terminal according to claim 9, wherein the signaling comprises first configuration information indicating the second carrier subset.

11. The terminal according to claim 10, wherein the first configuration information comprises one of the following: one or more carrier indexes, center frequency indexes or bitmaps, each indicating a respective one of one or more carriers of the second carrier subset.

12. The terminal according to claim 11, wherein the preset carrier set is preconfigured by the base station through broadcast information or high-level signaling as a preset carrier set S $\{S_0, S_1, \ldots, S_{M-1}\}$, and M is a positive integer greater than or equal to 2.

13. The terminal according to claim 12, wherein each carrier of the preset carrier set S $\{S_0, S_1, \ldots, S_{M-1}\}$ is at least configured a center frequency.

14. The terminal according to claim 13, wherein the first configuration information indicates a carrier index in the preset carrier set S $\{S_0, S_1, \ldots, S_{M-1}\}$ through $\lceil \log_2(M) \rceil$ bits, and $\lceil \ \rceil$ represents rounding-up.

15. The terminal according to claim 9, wherein the signaling is carried in at least one of a broadcast channel, Downlink Control Information (DCI) in a Common Search Space (CSS) of a Physical Downlink Control Channel (PDCCH), DCI in a CSS of an Enhanced PDCCH (EPDCCH), DCI in a User Equipment (UE)-specific Search Space (USS) of the PDCCH, DCI in a USS of the EPDCCH, a dedicated physical channel, a Media Access Control (MAC) header, a MAC Control Element (CE), system information of a Radio Resource Control (RRC) layer and dedicated signaling of the RRC layer.

16. The terminal according to claim 9, wherein in a case that the terminal currently transmits data or camps on the first carrier subset, the transceiver is configured to:

receive signaling sent by the base station at a second instant on the first carrier subset;

wherein the second instant corresponds to at least one of a sending subframe of the system information or a sending subframe of a paging channel.

* * * * *